US008995928B2

(12) United States Patent
Tajima et al.

(10) Patent No.: US 8,995,928 B2
(45) Date of Patent: Mar. 31, 2015

(54) RADIO COMMUNICATION METHOD, RADIO COMMUNICATION APPARATUS, AND RADIO COMMUNICATION SYSTEM

(71) Applicant: Fujitsu Limited, Kawasaki-shi, Kanagawa (JP)

(72) Inventors: Yoshiharu Tajima, Yokohama (JP);
Yoshinori Tanaka, Yokohama (JP);
Yoshihiro Kawasaki, Yokosuka (JP);
Yoshiaki Ohta, Yokohama (JP);
Katsumasa Sugiyama, Kawasaki (JP);
Kazuhisa Obuchi, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 210 days.

(21) Appl. No.: 13/692,408

(22) Filed: Dec. 3, 2012

(65) Prior Publication Data
US 2013/0095767 A1 Apr. 18, 2013

Related U.S. Application Data

(63) Continuation of application No. PCT/JP2010/060380, filed on Jun. 18, 2010.

(51) Int. Cl.
*H04B 1/00* (2006.01)
*H04W 4/00* (2009.01)
(Continued)

(52) U.S. Cl.
CPC ............ *H04W 76/023* (2013.01); *G08C 17/00* (2013.01); *H04W 28/06* (2013.01); *H04W 72/12* (2013.01)
USPC .............................................. 455/68; 455/466

(58) Field of Classification Search
USPC .................. 455/68, 466; 340/870.01, 870.02, 340/870.07, 870.08
See application file for complete search history.

(56) References Cited

U.S. PATENT DOCUMENTS 5,946,630 A * 8/1999 Willars et al. ................. 455/466
6,122,671 A * 9/2000 Farrar et al. ................... 370/913
(Continued)

FOREIGN PATENT DOCUMENTS

| EP | 1705933 | 9/2006 |
| EP | 1772997 | 4/2007 |
| JP | 2000-004475 | 1/2000 |
| JP | 2002-503405 | 1/2002 |
| JP | 2006-270963 | 10/2006 |

(Continued)

OTHER PUBLICATIONS

Office Action issued for corresponding Japanese Patent Application No. 2012-520233, mailed Aug. 6, 2013, with partial English translation.

(Continued)

*Primary Examiner* — Quochien B Vuong
(74) *Attorney, Agent, or Firm* — Myers Wolin, LLC

(57) ABSTRACT

A first radio communication apparatus includes a controller and a transmitter. The controller determines timing capable of transmitting a control parameter used for a process for establishing connection to a second radio communication apparatus when the connection is not established between the first and second radio communication apparatus. The transmitter transmits a message including data different from the control parameter to the second radio communication apparatus at determined timing. The second radio communication apparatus includes a receiver and a data processing unit. The receiver receives from the first radio communication apparatus the message transmitted at timing at which the first radio communication apparatus is able to transmit the control parameter. The data processing unit extracts data included in the received message.

6 Claims, 10 Drawing Sheets

(51) Int. Cl.
*H04W 76/02* (2009.01)
*G08C 17/00* (2006.01)
*H04W 28/06* (2009.01)
*H04W 72/12* (2009.01)

(56) References Cited

U.S. PATENT DOCUMENTS

| | | | |
|---|---|---|---|
| 6,369,719 | B1 | 4/2002 | Tracy et al. |
| 6,973,034 | B1 * | 12/2005 | Natarajan et al. ............ 370/232 |
| 7,471,666 | B2 * | 12/2008 | Chen ............................. 370/347 |
| 7,672,685 | B2 * | 3/2010 | Itoh ............................... 455/522 |
| 2006/0234732 | A1 | 10/2006 | Kim |
| 2007/0077917 | A1 | 4/2007 | Kim |

FOREIGN PATENT DOCUMENTS

| | | |
|---|---|---|
| JP | 2007-104684 | 4/2007 |
| JP | 2008-148134 | 6/2008 |
| WO | 94/05094 | 3/1994 |
| WO | 98/19447 | 5/1998 |
| WO | 2005/009066 | 1/2005 |

OTHER PUBLICATIONS

The extended European search report, the supplementary European search report and the European search opinion issued for corresponding European Patent Application No. 10853257.3, dated Jul. 15, 2013.

3rd Generation Partnership Project; Technical Specification Group Services and System Aspects; "Service requirements for Machine-Type Communications (MTC)"; Stage 1 (Release 10), Jun. 2010, pp. 1-25, 3GPP TS 22.368 V10.1.0, 3GPP.

3GPP TR 25.913 V7.3.0; 3rd Generation Partnership Project; Technical Specification Group Radio Access Network; "Requirements for Evolved UTRA (E-UTRA) and Evolved UTRAN (E-UTRAN) (Release 7)"; Mar. 2006.

3GPP TR 36.913 V8.0.1; 3rd Generation Partnership Project; Technical Specification Group Radio Access Network; "Requirements for further advancements for Evolved Universal Terrestrial Radio Access (E-UTRA) (LTE-Advanced) (Release 8)"; Mar. 2009.

3GPP TS 22.368 V1.0.0; 3rd Generation Partnership Project; Technical Specification Group Services and System Aspects; "Service requirements for machine-type communications; Stage 1 (Release 10)"; Aug. 2009.

International search report issued for corresponding International Patent Application No. PCT/JP2010/060380, mailed Sep. 14, 2010.

First Notification of Office Action issued by the State Intellectual Property Office of China for corresponding Chinese Patent Application No. 201080067324.7 dated Oct. 8, 2014, with an English Translation.

Notice of Final Rejection issued for corresponding Korean Patent Application No. 10-2012-7032572 mailed on Oct. 30, 2014, with an English translation.

* cited by examiner

FIG. 6

| (A) | TERMINAL ID | FLAG | MTC DATA |
|---|---|---|---|

| (B) | TERMINAL ID | FLAG | RRC CONTROL PARAMETER |
|---|---|---|---|

| (C) | TERMINAL ID | RRC CONTROL PARAMETER |
|---|---|---|

RADIO COMMUNICATION METHOD, RADIO COMMUNICATION APPARATUS, AND RADIO COMMUNICATION SYSTEM

CROSS-REFERENCE TO RELATED APPLICATION

This application is a continuation application of International Application PCT/JP2010/060380 filed on Jun. 18, 2010 and designated the U.S., the entire contents of which are incorporated herein by reference.

FIELD

The embodiments discussed herein are related to a radio communication method, a radio communication apparatus, and a radio communication system.

BACKGROUND

At present, radio communication systems such as cellphone systems are widely used. For attaining a further speeding up and wider bandwidth of radio communication, lively discussion is continuously performed about a next generation radio communication technology. For example, in a 3GPP (3rd Generation Partnership Project) being one of standard-setting organizations, there are proposed a radio communication system referred to as an LTE (Long Term Evolution) and a radio communication system referred to as an LTE-A (Long Term Evolution-Advanced) obtained by developing the LTE (see, for example, 3rd Generation Partnership Project, "Requirements for Evolved UTRA (E-UTRA) and Evolved UTRAN (E-UTRAN)", 3GGP TR 25.913 V7.3.0, 2006-03 and 3rd Generation Partnership Project, "Requirements for further advancements for Evolved Universal Terrestrial Radio Access (E-UTRA)", 3GPP TR 36.913 V8.0.1, 2009-03).

The above-described radio communication technology is used not only in radio communication through a terminal device operated by a user such as a cell-phone but also in radio communication through other various devices such as measurement devices. For example, a measurement device such as a gas meter or electric meter is considered to implement a system which reports measurement data to a server via a radio communication network. In 3GPP, an MTC (Machine Type Communication) is proposed as a mode of radio communication without an interaction with users (see, for example, 3rd Generation Partnership Project, "Service requirements for machine-type communications", 3GPP TS 22.368 V1.0.0, 2009-08).

Incidentally, when data is not transmitted and received, a radio communication apparatus moves to a state (an idle state) of releasing a connection with regard to radio communication. The radio communication apparatus in the idle state establishes the connection again when a predetermined procedure (transmission and reception of messages) is performed between its own apparatus and a radio communication apparatus of communication partner.

However, in the case where the radio communication apparatus intermittently transmits data, when the establishment and release for the connection are performed in every data transmission, overhead becomes large due to a procedure for establishing and releasing the connection, and efficiency of the data transmission is reduced. Particularly, as in an MTC system, in a radio communication system in which the amount of data to be transmitted once is supposed to be relatively small, the above-described overhead reflects a large influence on the data transmission efficiency

SUMMARY

According to an aspect of the embodiments to be discussed herein, there is provided a radio communication method for use in a radio communication system which includes first and second radio communication apparatus and in which the first radio communication apparatus transmits data to the second radio communication apparatus. This method includes: transmitting, by the first radio communication apparatus, a message including data different from a control parameter to the second radio communication apparatus at timing capable of transmitting the control parameter used for a process for establishing connection when the connection is not established between the first and second radio communication apparatus; receiving, by the second radio communication apparatus, from the first radio communication apparatus the message transmitted at timing at which the first radio communication apparatus is able to transmit the control parameter; and extracting, by the second radio communication apparatus, data included in the received message.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates a data structure of a Msg 3;

DESCRIPTION OF EMBODIMENTS

Figure 1:
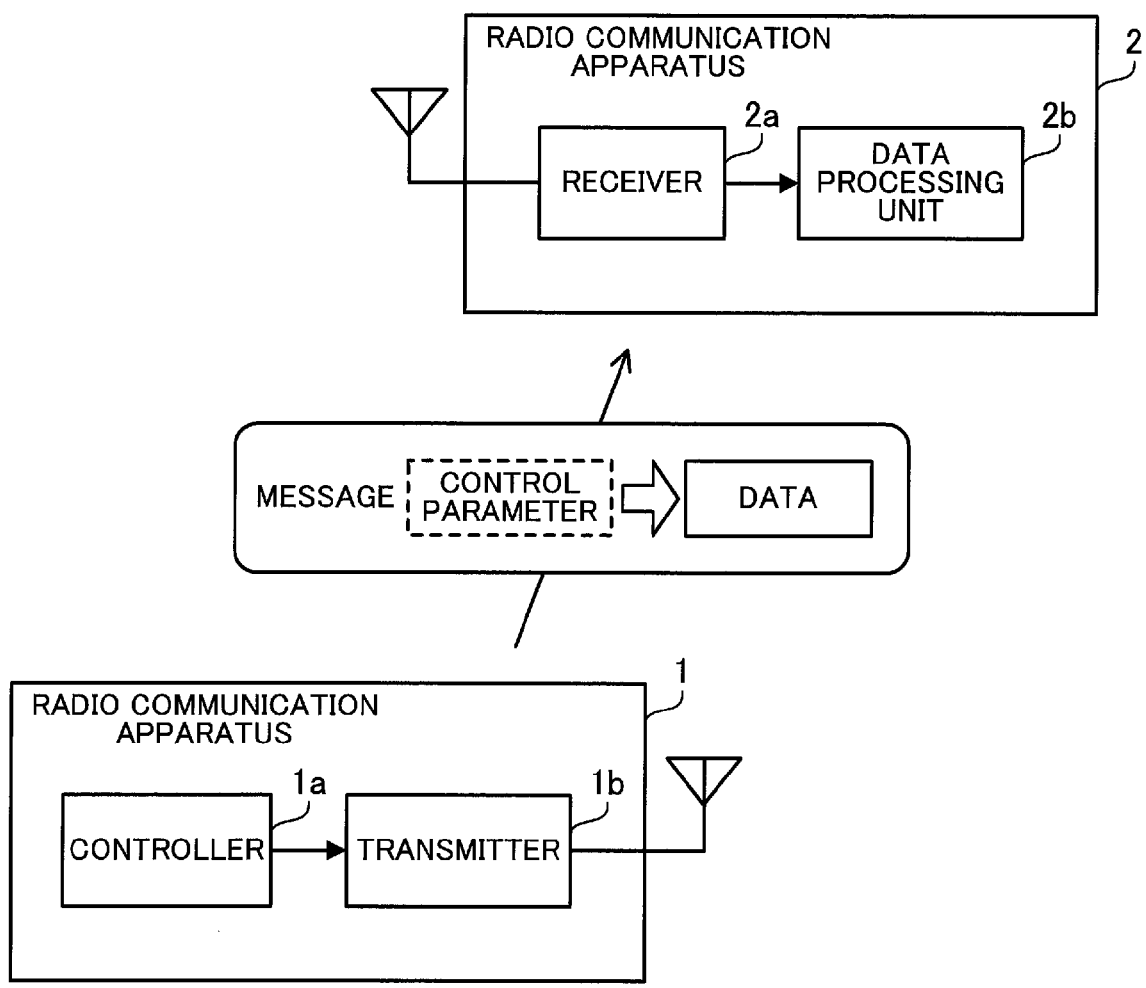
FIG. 1 illustrates a radio communication system according to a first embodiment.

Preferred embodiments of the present invention will now be described in detail below with reference to the accompanying drawings, wherein like reference numerals refer to like elements throughout.

First Embodiment

FIG. 1 illustrates a radio communication system according to a first embodiment. The radio communication system according to the first embodiment includes radio communication apparatus 1 and 2. For example, think of the radio communication system in which the radio communication apparatus 2 is deployed as a base station, and the radio communication apparatus 1 is deployed as a subscriber station which accesses the radio communication apparatus 2. The radio communication apparatus 1 transmits data to the radio communication apparatus 2 through radio communication. The radio communication apparatus 1 and 2 appropriately establish and release connection of radio communication.

The radio communication apparatus 1 has a controller 1*a* and a transmitter 1*b*. When the connection is not established between the radio communication apparatus 1 and 2, the controller 1*a* determines timing capable of transmitting a control parameter used for a process for establishing the connection to the radio communication apparatus 2. The transmitter 1*b* transmits a message including data different from the control parameter to the radio communication apparatus 2 at the timing determined by the controller 1*a*.

The radio communication apparatus 2 has a receiver 2*a* and a data processing unit 2*b*. From the radio communication apparatus 1 in which the connection is not established between the radio communication apparatus 1 and 2, the receiver 2*a* receives a message transmitted at timing at which the radio communication apparatus 1 is able to transmit a control parameter used for a process for establishing the connection. The data processing unit 2*b* extracts data different from the control parameter from among messages received by the receiver 2*a*. For example, the data processing unit 2*b* transfers the extracted data to a predetermined communication apparatus.

Here, the connection established between the radio communication apparatus 1 and 2 may be a connection defined by an RRC (Radio Resource Control) protocol being a layer 3 protocol. The above-described control parameter may be an RRC control parameter. Examples of the timing at which the radio communication apparatus 1 is able to transmit the control parameter include timing before the connection is established after the radio communication apparatus 1 performs a random access to the radio communication apparatus 2.

Further, the message transmitted by the radio communication apparatus 1 may include both of the control parameter and data different from the control parameter, or selectively include any one of them. When data different from the control parameter is extracted from among the received messages, the radio communication apparatus 2 may finish radio communication between its own apparatus and the radio communication apparatus 1 without performing a process for establishing the connection.

Further, in the radio communication apparatus 2, the radio communication apparatus 1 previously registers identification data of radio communication apparatus having the possibility of transmitting the data different from the control parameter at the timing. At the same time, the radio communication apparatus 1 may insert identification data of its own apparatus into the message. In this case, only when the identification data included in the received message is previously-registered identification data, the radio communication apparatus 2 is considered to extract the data different from the control parameter from the message. Further, the radio communication apparatus 1 may insert flag information indicating whether to include the data different from the control parameter into the message. In this case, the radio communication apparatus 2 determines based on the flag information whether to perform a process for extracting the data different from the control parameter from the received message.

In the above-described radio communication system of the first embodiment, when the connection is not established between the radio communication apparatus 1 and 2, the radio communication apparatus 1 transmits a message including data different from the control parameter to the radio communication apparatus 2 at timing capable of transmitting the control parameter used for a process for establishing the connection. From the radio communication apparatus 1, the radio communication apparatus 2 receives the message transmitted at timing at which the radio communication apparatus 1 is able to transmit the control parameter. The radio communication apparatus 2 then extracts data included in the received message.

As a result, before the connection is established between the radio communication apparatus 1 and 2, data is transmitted from the radio communication apparatus 1 to the radio communication apparatus 2. Further, after receiving the data, the radio communication apparatus 2 may finish radio communication between its own apparatus and the radio communication apparatus 1 without performing a process for establishing the connection. Accordingly, the radio communication apparatus 2 suppresses overhead of the radio communication and efficiently transmits data. The above-described radio communication method is particularly effectively performed in the case where the radio communication apparatus 1 intermittently transmits data, or the amount of data transmitted once is relatively small.

The radio communication system according to the first embodiment is deployed by using a radio communication technology of the LTE or LTE-A. Further, the radio communication system may be deployed as an MTC system. In a second embodiment described below, there is included an example of the MTC system deployed by using a radio communication technology of the LTE or LTE-A.

Second Embodiment

Figure 2:
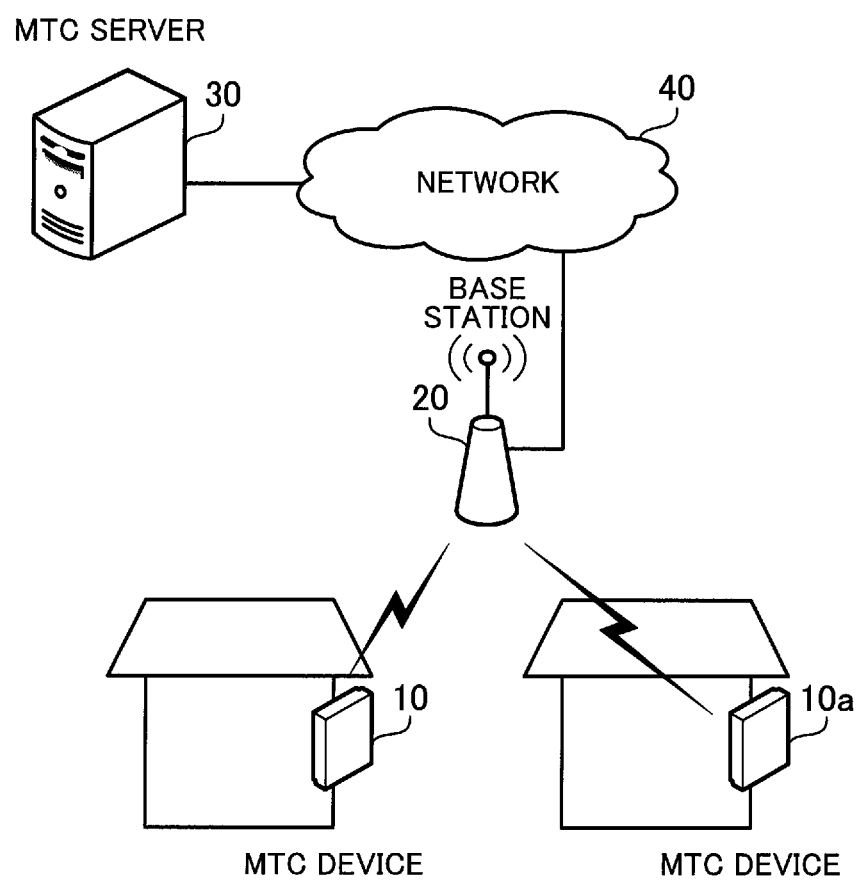
FIG. 2 illustrates a radio communication system according to a second embodiment.

FIG. 2 illustrates a radio communication system according to a second embodiment. The radio communication system of the second embodiment includes MTC devices 10 and 10*a*, a base station 20, an MTC server 30, and a network 40. The base station 20 performs data communication with the MTC server 30 via the network 40.

The MTC devices 10 and 10*a* are radio communication apparatus connected to meters provided on home or offices. As a meter, a gas meter, an electric meter, and a water meter are considered. The MTC devices 10 and 10*a* access the base station 20, and transmit various data including MTC data indicating measurement values of a meter to the MTC server 30 via the base station 20. The amount of the MTC data once transmitted by the MTC devices 10 and 10*a* is supposed to be small. In addition, a period for transmitting the MTC data is supposed to be long such as a period of one month.

As described later, the MTC device 10 has a function of transmitting the MTC data without establishing the RRC connection between its own device and the base station 20. On the other hand, the MTC device 10*a* has no function of transmitting the MTC data without establishing the RRC connection. Here, the RRC protocol is a layer 3 protocol with regard to the radio communication, and includes a function of a mobility management.

The base station 20 performs radio communication with the MTC devices 10 and 10*a*, and is a communication apparatus which performs wired communication with the MTC server 30. The base station 20 receives access from the MTC devices 10 and 10*a*, and wirelessly receives data from the MTC devices 10 and 10*a*. When wirelessly receiving the MTC data, the base station 20 transfers it to the MTC server 30 via the network 40. Examples of the network 40 include a core network and Internetwork managed by a telecommunications carrier.

The MTC server 30 is a server computer which collects MTC data from the MTC devices 10 and 10*a* and monitors meters. For example, the collected MTC data is used for a charging management. The MTC server 30 is provided in a network of a carrier (e.g., a gas company, a power company, and a water company) which installs meters.

Figure 3:
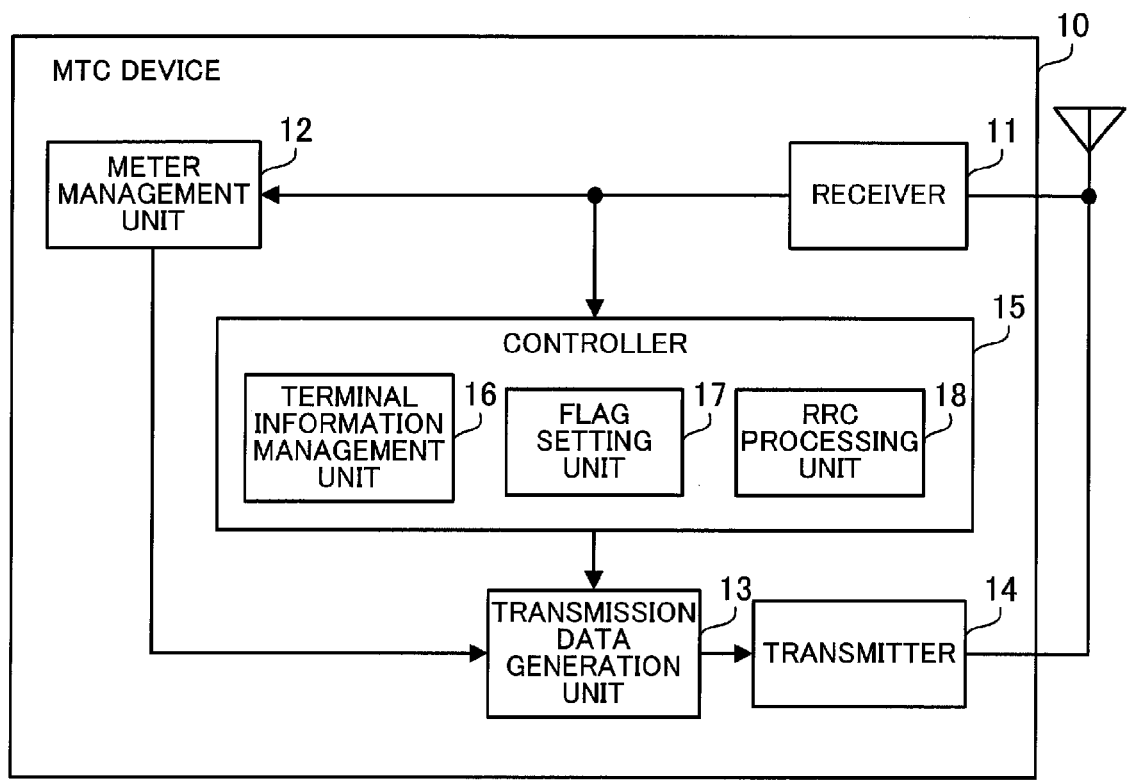
FIG. 3 is a block diagram illustrating an MTC device.

FIG. 3 is a block diagram illustrating an MTC device. The MTC device 10 has a receiver 11, a meter management unit 12, a transmission data generation unit 13, a transmitter 14, and a controller 15.

The receiver 11 radio-signal processes a signal received from the base station 20 through an antenna and performs a down conversion from a high-frequency radio signal to a low-frequency baseband signal. The receiver 11 then demodulates and error-correction decodes a baseband signal, and extracts the user data and control parameter transmitted by the base station 20. The receiver 11 supplies the extracted user data to the meter management unit 12, and supplies the extracted control parameter to the controller 15. Examples of the user data include a command for managing and operating a meter, transmitted by the MTC server 30. Examples of the control parameter include the after-mentioned random access response and RRC control parameter.

Based on the user data obtained from the receiver 11, the meter management unit 12 manages meters. The meter management unit 12 monitors a measurement value of the meter, and supplies MTC data indicating a measurement value to the transmission data generation unit 13 at a predetermined period or timing specified by the MTC server 30. The measurement value of meters includes the consumed amount of "energy" such as gas, electricity, and water.

According to control of the controller 15, the transmission data generation unit 13 generates a message to be transmitted to the base station 20 and supplies it to the transmitter 14. The transmission data generation unit 13 may insert into the message the MTC data obtained from the meter management unit 12 or the RRC control parameter obtained from the controller 15. In addition, the transmission data generation unit 13 may insert a terminal ID or flag described later into the message.

The transmitter 14 error-correction codes and modulates data being the message obtained from the transmission data generation unit 13, thereby generating a transmission signal. When data to be transmitted to the base station 20 is generated at the time when the MTC device 10 is placed in the idle state, the transmitter 14 generates a random access preamble as a transmission signal. The random access preamble is transmitted through a random access channel. The transmitter 14 then radio-signal processes a transmission signal and performs up-conversion from a low-frequency baseband signal to a high-frequency radio signal. Through the antenna, the transmitter 14 transmits a transmission signal being a radio signal to the base station 20.

The controller 15 controls an RRC connection between the MTC device 10 and the base station 20, and data transmission (up link communication) from the MTC device 10 to the base station 20. The controller 15 has a terminal information management unit 16, a flag setting unit 17, and an RRC processing unit 18.

The terminal information management unit 16 manages a terminal ID being identification data previously given to the MTC device 10. When the terminal ID is inserted into a message, the terminal information management unit 16 supplies it to the transmission data generation unit 13.

When a flag is inserted into the message, the flag setting unit 17 determines a value of the flag and supplies it to the transmission data generation unit 13. The flag indicates whether the MTC data to the MTC server 30 is included in the message before the RRC connection is established. For example, in the case where the MTC data is inserted into the message before the RRC connection is established, the flag setting unit determines that the flag is equal to one, and in the case where the MTC data is not inserted into the message, determines that the flag is equal to zero.

The RRC processing unit 18 transmits and receives an RRC control parameter between the MTC device 10 and the base station 20, and performs a process for establishing the RRC connection and a process for releasing the RRC connection. Based on the control parameter obtained from the receiver 11, for example, when the RRC connection is not established, the RRC processing unit 18 determines timing capable of transmitting an RRC connection request to the base station 20. The RRC processing unit 18 then supplies the RRC connection request being an RRC control parameter to the transmission data generation unit 13. Note that the RRC processing unit 18 fails to supply the RRC connection request in the case where the MTC data is inserted into the message before the RRC connection is established.

Figure 4:
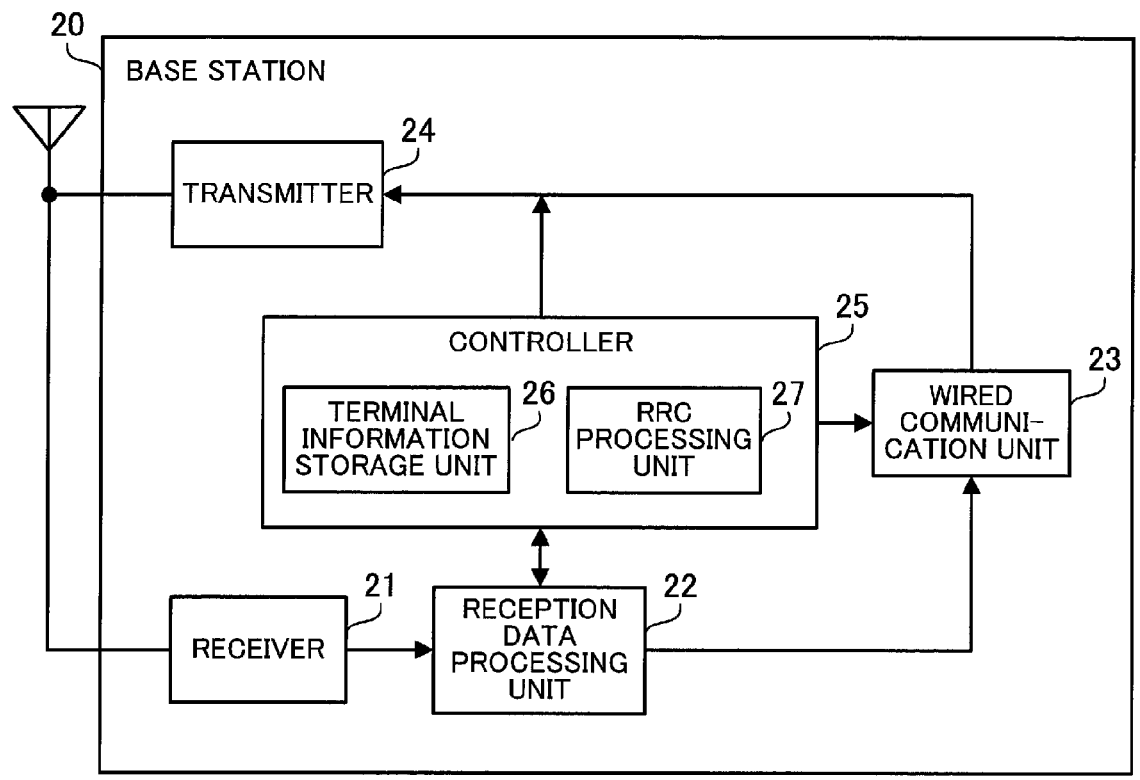
FIG. 4 is a block diagram illustrating a base station.

FIG. 4 is a block diagram illustrating a base station. The base station 20 has a receiver 21, a reception data processing unit 22, a wired communication unit 23, a transmitter 24, and a controller 25.

The receiver 21 radio-signal processes a signal received from the MTC devices 10 and 10*a* through an antenna, and performs down-conversion from a high-frequency radio signal to a low-frequency baseband signal. The receiver 21 then demodulates and error-correction decodes a baseband signal, and supplies a message transmitted by the MTC devices 10 and 10*a* to the reception data processing unit 22. The receiver 21 further detects the random access preamble transmitted by the MTC devices 10 and 10*a*.

According to control of the controller 25, the reception data processing unit 22 extracts the user data (including the MTC data) and control parameter included in the message obtained from the receiver 21. The reception data processing unit 22 supplies the extracted user data to the wired communication unit 23 and supplies the extracted control parameter to the controller 25. The control parameter includes an RRC control parameter.

Here, when obtaining a message transmitted at timing at which the MTC device 10 is able to transmit the RRC connection request, the reception data processing unit 22 determines whether any of the RRC control parameter and the MTC data are inserted into the message. Whether a terminal ID included in the message is registered in the terminal information storage unit 26 and whether a flag included in the message is a predetermined value are confirmed, thereby performing the above determination. Details of the determination method will be described later.

The wired communication unit 23 is connected to the network 40, and is a communication interface which performs wired communication. To the MTC server 30 via the network 40, the wired communication unit 23 transmits the MTC data obtained from the reception data processing unit 22 and the control parameter addressed to the MTC server 30 obtained from the controller 25. To the transmitter 24, the wired communication unit 23 further supplies the user data addressed to the MTC devices 10 and 10*a* received from the MTC server 30.

The transmitter 24 error-correction codes and modulates the user data obtained from the wired communication unit 23 and the control parameter obtained from the controller 25, thereby generating a transmission signal. When the random access preamble is detected by the receiver 21, the transmitter 24 further generates a random access response as a transmission signal. The transmitter 24 then radio-signal processes the transmission signal, and performs up-conversion from a low-frequency baseband signal to a high-frequency radio signal.

The transmitter 24 transmits a transmission signal being a radio signal to the MTC devices 10 and 10a through the antenna.

The controller 25 controls the MTC devices 10 and 10a to access the base station 20, and controls the base station 20 to receive the MTC data from the MTC devices 10 and 10a. The controller 25 has a terminal information storage unit 26 and an RRC processing unit 27.

Among radio communication apparatus (including the MTC devices 10 and 10a) which access the base station 20, the terminal information storage unit 26 stores terminal IDs of apparatus (including the MTC device 10) having the possibility of transmitting MTC data before the RRC connection is established. The terminal ID of the MTC device 10 may be previously registered, or registered through signaling between the MTC device 10 and the base station 20. In the latter case, the controller 25 transmits a control parameter indicating the terminal ID registered in the terminal information storage unit 26 to the MTC server 30 through the wired communication unit 23.

When the RRC control parameter is transmitted and received between the base station 20 and any of the MTC devices and 10a, the RRC processing unit 27 performs a process for establishing the RRC connection and a process for releasing the RRC connection. For example, when an RRC connection request is obtained from the reception data processing unit 22, the RRC processing unit 27 performs RRC protocol processing and supplies to the transmitter 24 an RRC control parameter (RRC connection setting information) as a response for the received RRC connection request.

Next, a process performed through the radio communication system according to the second embodiment will be described. First, a process in which a terminal ID of the MTC device 10 is registered in the base station 20 will be described, and then a process in which the MTC device 10 transmits MTC data to the MTC server 30 via the base station 20 will be described.

Figure 5:
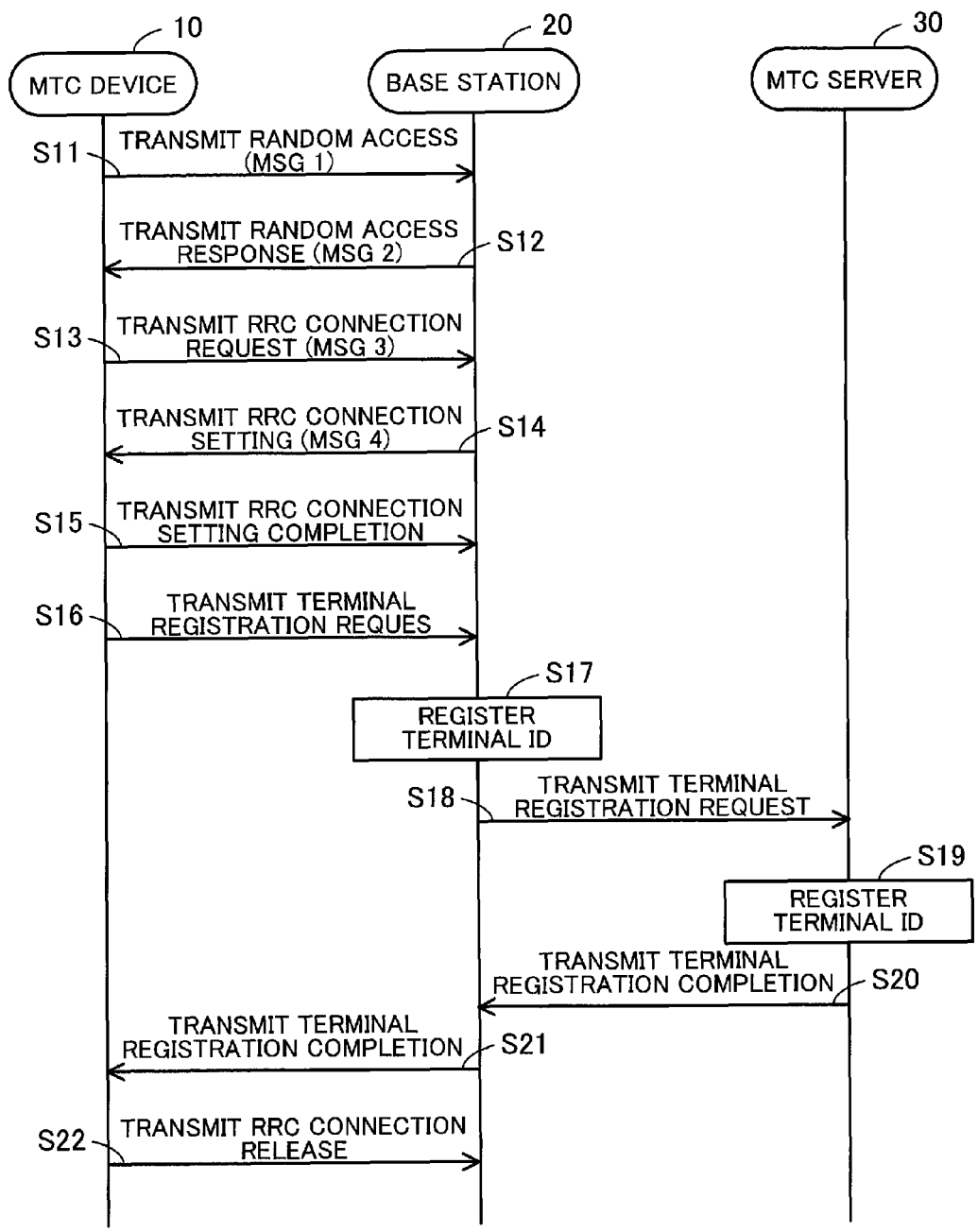
FIG. 5 is a sequence diagram illustrating a flow of terminal registration.

FIG. 5 is a sequence diagram illustrating a flow of a terminal registration. The process illustrated in FIG. 5 includes the following steps:

(Step S11) The MTC device 10 transmits a random access preamble to the base station 20. The transmitted random access preamble is selected from candidates of a plurality of previously defined signal sequences. The message transmitted at step S11 may be called a message 1 (Msg 1). Note that in the Msg 1, competition may occur, specifically, a plurality of radio communication apparatus may transmit the same signal sequence at the same timing.

(Step S12) When detecting the Msg 1 included in a reception signal, the base station 20 transmits a random access response message to a cell of its own station. Note that at this time, the base station 20 does not yet recognize a transmission source of the Msg 1. The message transmitted at step S12 may be called a message 2 (Msg 2).

(Step S13) When the Msg 2 is received from the base station 20, the MTC device 10 transmits an RRC connection request message to the base station 20. In the RRC connection request message, identification data of the MTC device 10 is included. The message transmitted at step S13 may be called a message 3 (Msg 3).

(Step S14) When receiving the Msg 3, the base station 20 recognizes the MTC device 10 as a transmission source based on the identification data included in the Msg 3. The base station 20 then performs a process for establishing the RRC connection, and transmits an RRC connection setting message and the received identification data to the MTC device 10. The message transmitted at step S14 may be called a message 4 (Msg 4). In the case where competition occurs in the random access, the base station 20 transmits the Msg 4 to any one transmission source of a plurality of competed transmission sources. In the case where the identification data of the MTC device 10 is not included in the Msg 4, the process returns to step S11 and the MTC device 10 transmits the Msg 1 to the base station 20 again.

(Step S15) When the Msg 4 is received from the base station 20, the MTC device 10 performs a process for establishing the RRC connection and sends back an RRC connection setting completion message to the base station 20.

(Step S16) When the RRC connection is established between the MTC device 10 and the base station 20, the MTC device 10 transmits a terminal registration request message to the base station 20. In this terminal registration request message, a terminal ID of the MTC device 10 is included.

(Step S17) When the terminal registration request message is received from the MTC device 10, the base station 20 registers the terminal ID of the MTC device 10 in its own station.

(Step S18) The base station 20 transmits the terminal registration request message to the MTC server 30 via the network 40. In this terminal registration request message, the terminal ID of the MTC device 10 is included.

(Step S19) When the terminal registration request message is received from the base station 20, the MTC server 30 registers the terminal ID of the MTC device 10 in its own device.

(Step S20) The MTC server 30 transmits a terminal registration completion message to the base station 20 as a response for the terminal registration request message.

(Step S21) When the terminal registration completion message is received from the MTC server 30, the base station 20 transmits the terminal registration completion message to the MTC device 10.

(Step S22) When the terminal registration completion message is received from the base station 20, the MTC device 10 transmits an RRC connection release message to the base station 20 and performs a process for releasing the RRC connection. When the RRC connection release message is received from the MTC device 10, the base station 20 performs a process for releasing the RRC connection.

As can be seen from the above discussion, when the signaling is performed between the MTC device 10 and the base station 20, the MTC server 30 registers the terminal ID of the MTC device 10 in the base station 20. The foregoing signaling may be performed only when the MTC device 10 is first connected to the base station 20. Alternatively, from a standpoint of security, an expiration date may be provided in the terminal ID registered in the base station 20 to regularly perform the signaling.

FIG. 6 illustrates a data structure of the Msg 3. The MTC device 10 having a function of transmitting MTC data without establishing the RRC connection transmits the Msg 3 of type A or B illustrated in FIG. 6. On the other hand, the MTC device 10a having no function of transmitting MTC data without establishing the RRC connection transmits the Msg 3 of type C.

The Msg 3 of type A includes a terminal ID, a flag, and MTC data. The flag of type A is set to a value (e.g., flag=1) indicating that the MTC data is included. The Msg 3 of type B includes the terminal ID, flag, and RRC control parameter used to establish the RRC connection. The flag of type B is set to a value (e.g., flag=0) indicating that the RRC control parameter is included. The Msg 3 of type C includes the terminal ID and RRC control parameter.

Here, since performing radio communication with both of the MTC devices 10 and 10a, the base station 20 has the possibility of transmitting any of the Msg 3 of types A, B, and C. To cope with the problem, the base station 20 first confirms that the terminal ID included in the Msg 3 is registered in the base station 20. Only in the case where the terminal ID is registered in the base station 20, the base station 20 confirms the flag and determines a type of the data included in the Msg 3.

Figure 7:
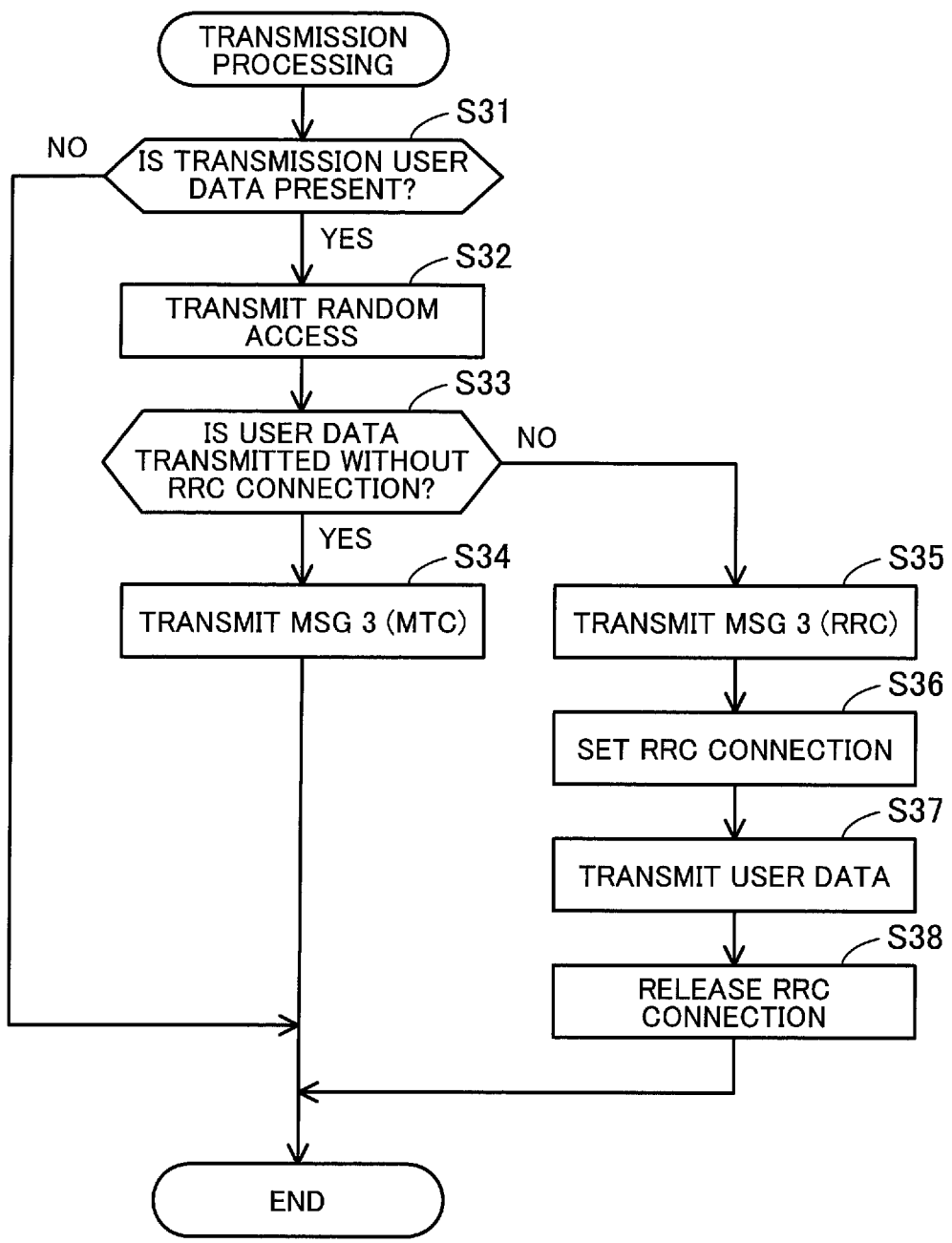
FIG. 7 is a flowchart illustrating data transmission processing.

FIG. 7 is a flowchart illustrating data transmission processing. This process illustrated in FIG. 7 is executed by the MTC device 10. The process illustrated in FIG. 7 includes the following steps:

(Step S31) The controller 15 determines whether user data (including the MTC data) to be transmitted to the base station 20 is present. If so, the process proceeds to step S32. If not, the process ends.

(Step S32) The transmitter 14 transmits the random access preamble (Msg 1) to the base station 20. The receiver 11 receives the random access response message (Msg 2) from the base station 20. Note here that competition of the Msg 1 is supposed not to occur.

(Step S33) When the Msg 2 is received from the base station 20, the controller 15 identifies timing for transmitting the Msg 3 to the base station 20. The controller 15 further determines whether user data to be transmitted to the base station 20 is capable of being transmitted without the RRC connection. For example, the controller 15 determines that the MTC data having a predetermined size or less is capable of being transmitted without the RRC connection, and that the user data except the above MTC data is incapable of being transmitted without the RRC connection. If so, the process advances to step S34. If not, the process proceeds to step S35.

(Step S34) The transmission data generation unit 13 generates a message (the above-described Msg 3 of type A) including the terminal ID, flag, and MTC data. The transmitter 14 transmits the Msg 3 to the base station 20. The receiver 11 receives the Msg 4 as a response for the Msg 3 from the base station 20. Through the above steps, transmission processing of the MTC data ends and the process returns to an idle state.

(Step S35) The transmission data generation unit 13 generates a message (the above-described Msg 3 of type B) including the terminal ID, flag, and RRC control parameter. The transmitter 14 transmits the Msg 3 to the base station 20. The receiver 11 receives the Msg 4 as an RRC connection setting message from the base station 20.

(Step S36) The controller 15 performs a process for establishing the RRC connection between the MTC device 10 and the base station 20. The transmission data generation unit 13 generates an RRC connection setting completion message. The transmitter 14 transmits the RRC connection setting completion message to the base station 20.

(Step S37) The transmission data generation unit 13 generates a message including the user data. The transmitter 14 transmits the generated message to the base station 20.

(Step S38) The transmission data generation unit 13 generates an RRC connection release message. The transmitter 14 transmits the RRC connection release message to the base station 20. The controller 15 performs a process for releasing the RRC connection. Through the above steps, the process returns to an idle state.

As can be seen from the above sequence, the MTC device 10 transmits the MTC data to the base station 20 without the RRC connection. When a flag is provided on the Msg 3, the MTC device 10 selectively uses data transmission performed without establishing the RRC connection and data transmission performed by establishing the RRC connection.

Here, the RRC protocol has a function of mobility management and makes a contribution to improvement of communication quality at the time when a radio communication apparatus moves. On the other hand, the MTC device 10 connected to a meter is supposed not to move. The MTC data transmitted by the MTC device 10 is further supposed to have a relatively small size. Accordingly, in the second embodiment, an influence to communication quality is expected to be small due to the fact that the RRC connection is not established.

Figure 8:
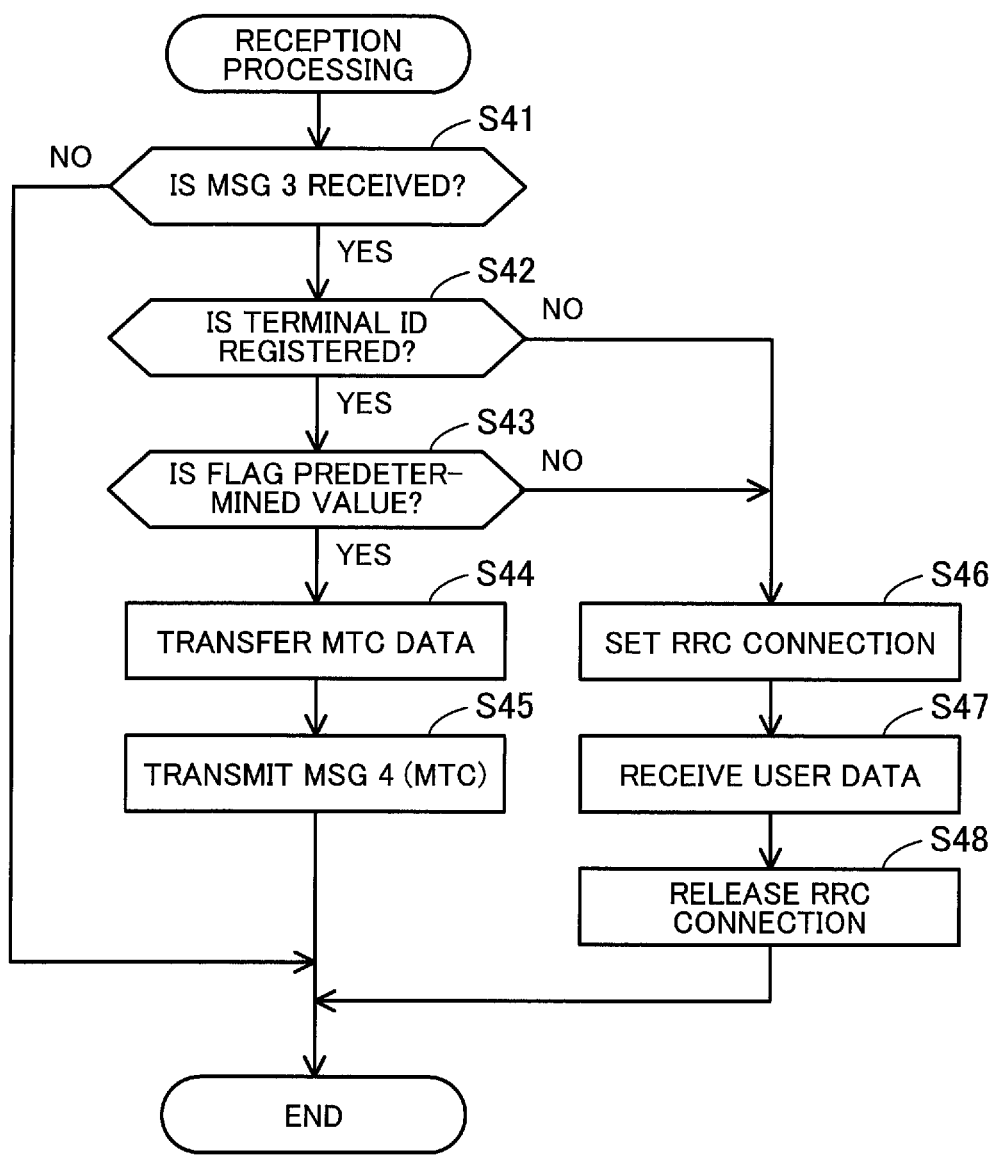
FIG. 8 is a flowchart illustrating data reception processing.

FIG. 8 is a flowchart illustrating data reception processing. This process illustrated in FIG. 8 is executed by the base station 20. The process illustrated in FIG. 8 includes the following steps:

(Step S41) The reception data processing unit 22 determines whether the Msg 3 is received from the MTC device 10. If so, the process proceeds to step S42. If not, the process ends.

(Step S42) The reception data processing unit 22 determines whether the terminal ID included in the Msg 3 is registered in the terminal information storage unit 26. If so, the process advances to step S43. If not, the process proceeds to step S46.

(Step S43) The reception data processing unit 22 determines whether the flag included in the Msg 3 is a predetermined value (e.g., flag=1) indicating that the MTC data is included. If so, the process advances to step S44. If not (e.g., flag=0), the process proceeds to step S46.

(Step S44) The reception data processing unit 22 extracts the MTC data from the received Msg 3. The wired communication unit 23 transfers the extracted MTC data to the MTC server 30.

(Step S45) The controller 25 generates a data reception response message as the Msg 4. The transmitter 24 transmits the Msg 4 to the MTC device 10. Through the above steps, reception processing of the MTC data ends.

(Step S46) The controller 25 performs a process for establishing the RRC connection, and generates an RRC connection setting message as the Msg 4. The transmitter 24 transmits the Msg 4 to the MTC device 10.

(Step S47) The receiver 21 receives a message including the user data from the MTC device 10. The reception data processing unit 22 extracts the user data from the message. The wired communication unit 23 outputs the extracted user data to the network 40.

(Step S48) The receiver 21 receives an RRC connection release message from the MTC device 10. The reception data processing unit 22 extracts the RRC control parameter included in the RRC connection release message. The controller 25 performs a process for releasing the RRC connection.

Figure 9:
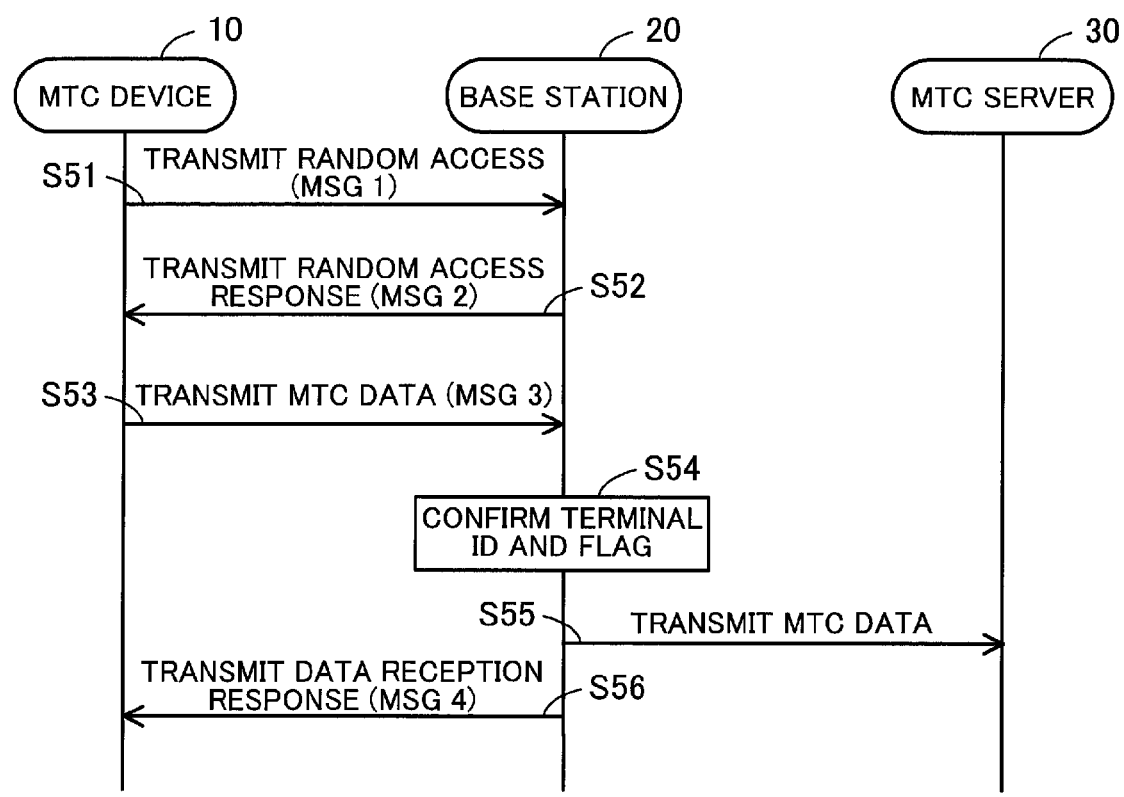
FIG. 9 is a sequence diagram illustrating a flow of data transmission in which an RRC connection is not established.

FIG. 9 is a sequence diagram illustrating a flow of data transmission in which an RRC connection is not established. The process illustrated in FIG. 9 includes the following steps:

(Step S51) The MTC device 10 transmits the Msg 1 to the base station 20.

(Step S52) The base station 20 transmits the Msg 2 to the MTC device 10.

(Step S53) The MTC device 10 transmits the Msg 3 (the above-described Msg 3 of type A) including the MTC data to the base station 20.

(Step S54) The base station 20 confirms the terminal ID and flag included in the received Msg 3, and determines that the MTC data is included in the Msg 3.

(Step S55) The base station 20 extracts the MTC data from the received Msg 3, and transfers it to the MTC server 30.

(Step S56) The base station 20 transmits a data reception response message as the Msg 4 to the MTC device 10. Through the above steps, the RRC connection is not established between the MTC device 10 and the base station 20, and the data transmission from the MTC device 10 to the base station 20 ends.

Figure 10:
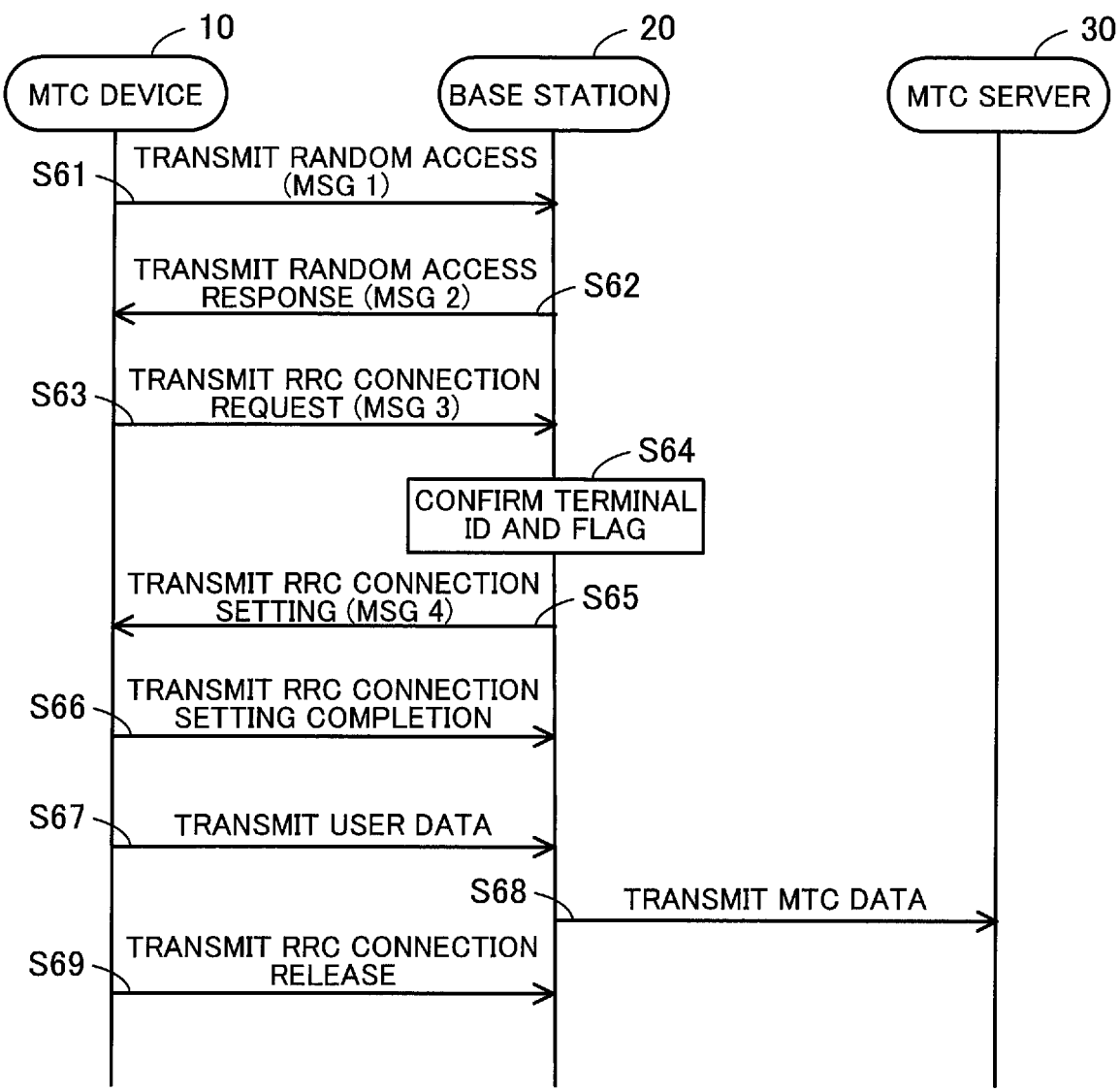
FIG. 10 is a sequence diagram illustrating a flow of data transmission in which an RRC connection is established.

FIG. 10 is a sequence diagram illustrating a flow of data transmission in which the RRC connection is established. The process illustrated in FIG. 10 includes the following steps:

(Step S61) The MTC device 10 transmits the Msg 1 to the base station 20.

(Step S62) The base station 20 transmits the Msg 2 to the MTC device 10.

(Step S63) The MTC device 10 transmits the Msg 3 (the above-described Msg 3 of type B) including the RRC control parameter to the base station 20.

(Step S64) The base station 20 confirms the terminal ID and flag included in the received Msg 3, and determines that the RRC control parameter is included in the Msg 3.

(Step S65) The base station 20 performs a process for establishing the RRC connection, and transmits an RRC connection setting message as the Msg 4 to the MTC device 10.

(Step S66) The MTC device 10 performs a process for establishing the RRC connection, and transmits the RRC connection setting completion message to the base station 20.

(Step S67) The MTC device 10 transmits the user data to the base station 20. In the user data herein transmitted, the MTC data may be included.

(Step S68) In the case where the MTC data is included in the received user data, the base station 20 transfers the MTC data to the MTC server 30.

(Step S69) The MTC device 10 transmits the RRC connection release message to the base station 20. Through the above steps, the data transmission from the MTC device 10 to the base station 20 ends.

The second embodiment provides a radio communication system in which the MTC device 10 does not perform a process for establishing an RRC connection and transmits MTC data to the base station 20. Accordingly, even in the case where the MTC data having a relatively small size is intermittently transmitted, the MTC device 10 deletes overhead of radio communication along with establishment and release of the RRC connection and efficiently transmits the MTC data. In the radio communication system of the second embodiment, since the base station 20 authenticates a terminal ID, an MTC device which is capable of transmitting data without establishing the RRC connection and an MTC device which is incapable of transmitting data without establishing the RRC connection are mixed.

In the second embodiment described above, the Msg 3 is used as a message for inserting the MTC data. However, a message used to transmit the MTC data is not limited to the Msg 3, and also other messages may be used at timing at which the MTC device 10 is able to transmit an RRC control parameter to the base station 20.

According to the above-described radio communication method, radio communication apparatus, and radio communication system, overhead of radio communication is suppressed and data is efficiently transmitted.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A radio communication method for use in a radio communication system which includes first and second radio communication apparatus and in which the first radio communication apparatus transmits data to the second radio communication apparatus, the radio communication method comprising:

transmitting, by the first radio communication apparatus, a message including data different from control information and source information indicating a source radio communication apparatus as a transmission source of the message to the second radio communication apparatus at a time point capable of transmitting the control information used for a process for establishing connection when the connection is not established between the first and second radio communication apparatus;

receiving, by the second radio communication apparatus, from the first radio communication apparatus the message transmitted at the time point when the first radio communication apparatus is able to transmit the control information; and extracting, by the second radio communication apparatus, data different from the control information from the received message only when the source radio communication apparatus indicated by the source information in the received message is registered in the second radio communication apparatus.

2. The radio communication method according to claim 1, wherein in the case where data different from the control information is extracted from the received message, the second radio communication apparatus does not perform the process for establishing the connection.

3. The radio communication method according to claim 1, wherein in place of the control information, the first radio communication apparatus inserts data different from the control information into the message.

4. The radio communication method according to claim 1, wherein:

the message includes flag information indicating the presence or absence of data different from the control information; and the second radio communication apparatus extracts data different from the control information when the second radio communication apparatus determines based on the flag information that data different from the control information is included in the message.

5. The radio communication method according to claim 1, wherein the message is a message that is transmitted before connection is established after the first radio communication apparatus performs a random access to the second radio communication apparatus.

6. A radio communication apparatus to receive data from another radio communication apparatus, the radio communication apparatus comprising:

a receiver configured to receive a message including data different from control information and source information indicating a source radio communication apparatus as a transmission source of the message, transmitted at a time point when said another radio communication apparatus is able to transmit the control information used for a process for establishing connection from said another radio communication apparatus in which the connection is not established between said another radio communication apparatus and the radio communication apparatus; and a data processing unit configured to extract data different from the control information from the received message only when the source radio communication apparatus indicated by the source information in the received message is registered in the radio communication apparatus.

* * * * *